US005737433A

United States Patent [19]

Gardner

[11] Patent Number: 5,737,433
[45] Date of Patent: Apr. 7, 1998

[54] SOUND ENVIRONMENT CONTROL APPARATUS

[76] Inventor: William A. Gardner, 6950 Yount St., Yountville, Calif. 94599

[21] Appl. No.: 587,357

[22] Filed: Jan. 16, 1996

[51] Int. Cl.[6] ........................................ H04B 15/00
[52] U.S. Cl. .................. 381/94.7; 381/71.1; 381/94.1
[58] Field of Search .............. 381/71, 94, 94.1–94.9, 381/71.1–71.14

[56] References Cited

U.S. PATENT DOCUMENTS

| | | |
|---|---|---|
| 3,576,564 | 4/1971 | Galvin . |
| 4,363,112 | 12/1982 | Widrow . |
| 4,480,480 | 11/1984 | Scott et al. . |
| 4,580,224 | 4/1986 | Gerber . |
| 4,589,137 | 5/1986 | Miller .......................... 381/94.7 |
| 4,604,738 | 8/1986 | Aggarwal et al. . |
| 4,630,246 | 12/1986 | Fogler . |
| 4,653,102 | 3/1987 | Hansen . |
| 4,658,426 | 4/1987 | Chabries et al. . |
| 4,792,915 | 12/1988 | Adams et al. . |
| 4,809,238 | 2/1989 | Bishop et al. . |
| 4,857,867 | 8/1989 | Griffith . |
| 4,858,199 | 8/1989 | Griffith . |
| 4,878,188 | 10/1989 | Ziegler, Jr. . |
| 4,912,767 | 3/1990 | Chang . |
| 5,020,538 | 6/1991 | Morgan et al. . |
| 5,027,123 | 6/1991 | Haykin et al. . |
| 5,039,210 | 8/1991 | Welstead et al. . |
| 5,113,389 | 5/1992 | Cox . |
| 5,117,401 | 5/1992 | Feintuch . |
| 5,126,681 | 6/1992 | Ziegler, Jr. et al. . |
| 5,140,640 | 8/1992 | Graupe et al. . |
| 5,148,488 | 9/1992 | Chen et al. . |
| 5,157,596 | 10/1992 | Alcone . |
| 5,187,657 | 2/1993 | Forbes . |
| 5,209,237 | 5/1993 | Rosenthal . |
| 5,222,146 | 6/1993 | Bahl et al. . |
| 5,226,016 | 7/1993 | Christman . |
| 5,228,087 | 7/1993 | Bickerton . |
| 5,233,681 | 8/1993 | Bahl et al. . |
| 5,251,262 | 10/1993 | Suzuki et al. . |
| 5,251,263 | 10/1993 | Andrea et al. .............. 381/71 |
| 5,265,042 | 11/1993 | Smith, Jr. . |
| 5,267,345 | 11/1993 | Brown et al. . |
| 5,274,314 | 12/1993 | Maqueira . |
| 5,278,911 | 1/1994 | Bickerton . |
| 5,278,942 | 1/1994 | Bahl et al. . |
| 5,280,562 | 1/1994 | Bahl et al. . |
| 5,293,584 | 3/1994 | Brown et al. . |
| 5,301,130 | 4/1994 | Alcone et al. . |
| 5,309,378 | 5/1994 | Beierle . |
| 5,327,506 | 7/1994 | Stites ............................ 381/71 |
| 5,329,587 | 7/1994 | Morgan et al. . |
| 5,333,236 | 7/1994 | Bahl et al. . |
| 5,365,492 | 11/1994 | Dragoset, Jr. . |

(List continued on next page.)

*Primary Examiner*—Wing F. Chan
*Assistant Examiner*—Duc Nguyen
*Attorney, Agent, or Firm*—John P. O'Banion

[57] ABSTRACT

A sound environment control apparatus which allows a user, by operating a remote control unit, to selectively suppress any or all of multiple noises in his or her environment, or selectively listen to any of these while suppressing all other sound. One or more "primary" sound detectors are located in the user's sound domain to acquire all sounds that the user desires to hear as well as interfering sounds, and one or more "reference" sound detectors are placed at each interfering sound source that the user may wish to be able to control. Signals from the sound detectors are sent to a central processing unit/multiple sound controller where the interfering sounds are adaptively cancelled from the total audio provided by each primary sound detector or, when enhancement of a particular sound, rather than suppression, is desired, the audio from a reference sound detector is amplified and added to the total sound from the primary sound detector or used to replace the total sound from the primary sound detector. The resultant processed sound is then provided to the user.

23 Claims, 7 Drawing Sheets

U.S. PATENT DOCUMENTS

| | | |
|---|---|---|
| 5,371,802 | 12/1994 | Mc Donald et al. . |
| 5,384,853 | 1/1995 | Kinoshita et al. . |
| 5,388,080 | 2/1995 | Feintuch et al. . |
| 5,396,414 | 3/1995 | Alcone . |
| 5,406,622 | 4/1995 | Silverberg et al. . |
| 5,416,844 | 5/1995 | Nakaji et al. . |
| 5,425,105 | 6/1995 | Lo et al. . |
| 5,431,170 | 7/1995 | Mathews . |
| 5,442,591 | 8/1995 | Dragoset, Jr. et al. . |
| 5,442,648 | 8/1995 | Du Bose et al. . |
| 5,444,786 | 8/1995 | Raviv . |
| 5,448,531 | 9/1995 | Dragoset, Jr. . |
| 5,448,645 | 9/1995 | Guerci . |
| 5,602,962 | 2/1997 | Kellermann ............................ 381/94.7 |
| 5,610,991 | 3/1997 | Janse ...................................... 381/94.7 |

SOUND ENVIRONMENT CONTROL APPARATUS

BACKGROUND OF THE INVENTION

1. Field of the Invention

This invention pertains generally to abating environmental noise pollution, and more particularly to an apparatus and method for selective control of sounds in the listener's environment.

2. Description of the Background Art

Environmental noise pollution is a significant problem which can be detrimental to a person's hearing, which affects the ability of a person to hear desired sounds, and which can pose potentially dangerous conditions. For example, noise from power tools and the like can cause hearing loss if not attenuated. Noise pollution also can cause irritability and thereby detract from productivity on the job as well as from the ability to rest.

While, ear plugs and ear covers are effective at strongly attenuating noise, they leave the user unable to hear external communications or other important sounds, such as safety warnings. Also, effective ear plugs are awkward to use. Therefore, use of ear plugs can not only be inconvenient, but they, as well as ear covers, can also be dangerous. Further, if no ear protection is used, either mental exhaustion or actual damage to the ear can occur.

Alternative approaches to environmental noise control include acoustically active control devices where acoustical waves in the air are cancelled. Such approaches, however, have met with limited success. In some applications, either the zones where adequate suppression is realizable are too small thereby limiting the range of motion of the listener, or the degree of suppression is inadequate, or both. Active noise control is reportedly only effective at low frequencies, that is, frequencies on the order of 1000 Hertz (Hz) and less, and the degree of suppression of low frequency noise is reportedly limited to 10 to 15 decibels (dB) with present technology. Active noise control is applicable only to nearby noise sources, that is, sources that are on the order of one wavelength or closer to the active elements being used. Further, for cancellation of very low frequencies, acoustically active noise cancellation devices can be excessively large or heavy. Thus, active headsets, which simply subtract sound picked up by a microphone held by the user, can attenuate only low frequency sounds, and can only be made selective among all low-frequency sounds by using a directive microphone. Furthermore, the degree of suppression is reportedly no more than 15 to 20 dB, and those versions that provide more than 10 to 15 dB suppression require the inconvenience of microphones placed in the listener's ear canals during periods of supervised training of the adaptive components, and restrict the listener's movements. Therefore, their applications are extremely limited.

Attempts to legislate noise abatement by actually modifying equipment or equipment enclosures to reduce the amount of noise emitted have also met with limited success due in part to technical difficulties and in part to the profit motive and its impact on both business and politics. Nevertheless, progress in this area of passive noise suppression can go hand in hand with the present invention.

Therefore, there is a need for an environmental noise control apparatus which is essentially no more difficult or inconvenient to use than ear covers, which provides for suppression of either all sound or only selected sounds, which enables the user to remain in communication with others and to hear other important or desirable sounds, and which enables the user to move freely throughout relatively large domains. The present invention satisfies these needs, as well as others, and overcomes the deficiencies found in conventional noise control devices.

SUMMARY OF THE INVENTION

The present invention pertains to an apparatus with which a person can exercise considerable control over his or her sound environment. In general terms, the apparatus uses both passive noise suppression to acoustically isolate the listener from environmental sounds, and electrically active sound control to process the environmental sounds prior to supplying them to the listener. The apparatus generally includes a light-weight set of ear covers or cups which is worn by the user (e.g., a headset), a hand-held remote control unit, a central processing unit, and a plurality of microphones. By pushing buttons on the remote control unit, the user can turn off or turn down the volume on any or all of a wide variety of undesirable sounds in his or her environment, or can turn up the volume of sounds of particular interest.

By way of example, and not of limitation, the invention employs one or more "primary sound detectors" that pick up all sounds in the user's immediate environment that he or she desires to hear. These sound detectors can be one or more omni-directional units that are placed throughout the user's sound domains, a single directional or omni-directional unit or a pair of such units that are placed on the headset, or both sets of sound detectors can be used with either set being selected by the push of a button on the control unit. Where one or two sound detectors are mounted on the headset, directional units would give the listener, through head movement and/or head orientation, a better sense of direction-of-arrival of desired sounds than omni-directional units. The sound domains in which the sound detectors are placed can be a single room in a house, shop, office, or the like, a suite of rooms, such as an entire house, office complex, or a limited outdoor region, such as a garden or construction site.

In addition to the primary sound detectors, the invention employs one or more "reference sound detectors" which are directional and/or shielded (D/S) units placed at each sound source that the user may wish to be able to control by powering the sound source or detector on or off, and turning down the volume, turning off the volume or, in come cases, turning up the volume of the sound source. Examples of such sound sources include noisy machinery, power tools, dental drill noise, another person's voice (e.g., for person-to-person communication, propeller noise from helicopters and aircraft, engine noise, televisions, stereos, noisy children, crying babies, barking dogs, window-mounted air conditioners, street noise entering a room through a window, and the like. These reference sound detectors, as well as the primary units, can be permanently placed or be portable and even steerable manually and/or automatically. In operation, they send their received audio to a central processing unit (CPU) with a multiple sound controller (MSC). The sound detectors can be hardwired to the CPU/MSC or can be configured to transmit their audio to the CPU/MSC by radio or infrared signals. Hardwired sound detectors are particularly suited for installations where the noise source is stationary and the CPU/MSC is remotely located from the user, whereas use of radio or infrared signals is particularly suited where the CPU is carried by the user or the noise sources are mobile such as in the case of a person or certain equipment.

At the CPU/MSC, the audio from the individual sound sources can be adaptively equalized and subtracted (i.e., adaptively cancelled) from the total audio provided by each primary sound detector or, when enhancement rather than suppression of a particular sound is desired, the audio from a reference sound detector can be amplified and added to the total sound from the primary sound detector, or be used to replace the total sound from the primary sound detector. When undesirable sound occupies only a relatively small fraction of the spectral band occupied by the desired sound, the reference sound detector can be dispensed with and a band rejection filter can be used instead to process the sound from the primary detector. The particular sound sources are selected and controlled by the user simply pushing a few buttons on a remote control unit, in a manner similar to the simplest television remote controls. The resultant processed sound obtained from the electrically active sound controller is then fed through radio signals, infrared signals, direct wiring or the like to speakers inside ear covers which acoustically isolate the ears of the user from all environmental noise or, alternatively (especially for listeners with conduction hearing loss), to bone vibrators placed on the user's mastoid processes. In this way, the user can selectively suppress any or all of multiple noises in his or her environment, or selectively listen to any of these while suppressing all other sound.

Further, the invention could include an integrated portable telephone so that the user could call out or receive calls anywhere in his or her domain. Similarly, intercom systems, wireless speakers, and cellular telephones also can be integrated into the apparatus.

While adaptive dispersive multipath channel matching with training data (from the D/S sound detectors) is possible with today's digital signal processing technology, the level of performance will be limited in large part by the degree of nonstationarity of the acoustic channels. Therefore, the present invention can be configured to render the channels stationary, except for possible reflections and shadowing caused by moving listeners, by fixing the locations of all sound detectors either permanently or temporarily for portable use, and by using radio or infrared for the communication link with the listener. However, in those applications where the channel is strongly nonstationary because the sound source to be controlled is moving (e.g., children, some power tools, and so on), or because the primary sound detectors are located on a moving listener, the degree of suppression attainable will be limited by the speed of motion. Therefore, it is preferable to use fast-converging algorithms for adaptive channel matching, and also for tracking if automatically tracking directional reference sound detectors are used.

Where noise sources are uncooperative and/or inaccessible, stick-on throwaway cordless microphones or the like can be employed, or a directive microphone held and steered automatically and/or manually by the user can be employed when this is convenient. In this latter case, the invention functions as a steerable sound nuller, which is the opposite of the function of the steerable directive microphone it uses.

Unlike acoustically active noise control systems, with the present invention there is no dichotomy of methodology (feedback or feedforward) that is dependent on the applications, since electronic delays can be inserted wherever needed to ensure that feedforward methodology alone is adequate. Further, there is no dichotomy between methodology (acoustically active cancellation or passive suppression by acoustic isolation) that is dependent on frequency content of noise sources. Therefore, the breadth of applicability is far greater than that of spatial zone nulling, including active head sets, and can either complement or competitively replace methods of passive acoustic isolation.

An object of the invention is to control a person's sound environment.

Another object of the invention is to reduce stress resulting from environmental noise.

Another object of the invention is to protect against hearing damage.

Another object of the invention is to enhance the hearing of the hearing impaired.

Another object of the invention is to reduce or eliminate safety hazards resulting from near deafness caused by current noise protection products.

Another object of the invention is to provide for environmental noise suppression while enabling natural communication.

Another object of the invention is to provide a listener with hearing access to remote sources of sound.

Another object of the invention is to provide a sound environment control apparatus which is easy and convenient to use.

Another object of the invention is to provide a sound environment control apparatus that has the advantages of ear covers plus the substantial increase in flexibility where either all sound or only selected sounds are suppressed or amplified.

Another object of the invention is to provide a sound environment control apparatus which enables the user to move freely throughout relatively large domains.

Another object of the invention is to provide a sound environment control apparatus that is portable.

Another object of the invention is to realize a higher degree of noise suppression throughout a larger domain than that attainable with most active noise-control methods/apparatus.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus generally shown in FIG. 1 through FIG. 8, where like reference numerals denote like parts. It will be appreciated that the apparatus may vary as to configuration and as to details of the parts without departing from the basic concepts as disclosed herein.

Figure 1:
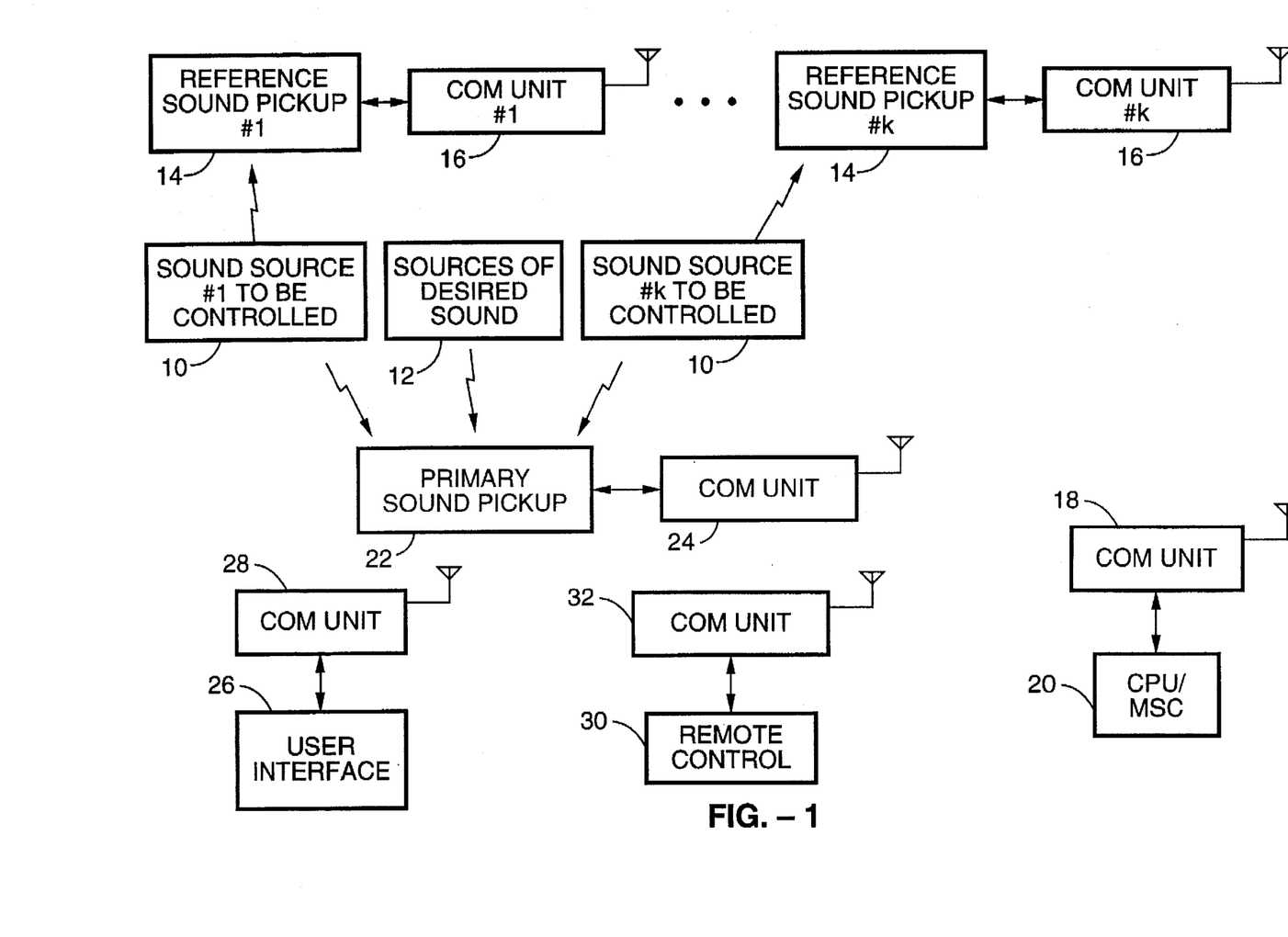
FIG. 1 is functional block diagram of a sound environment control apparatus in accordance with the present invention.

Referring first to FIG. 1, there is shown a system block diagram of a sound environment control apparatus in accordance with the present invention. In a typical environment or sound domain there are one or more sound sources 10 which interfere with one or more desired sound sources 12. Each interfering sound source 10 to be controlled is equipped with or assigned to one or more reference sound pickups 14, such as contact, or nearby or remote directional microphones, piezo-electric transducers, or other acoustic or vibrational sensors that convert a measurement of the sound being emitted from that source into an electrical signal. Each reference sound pickup 14 is coupled to a communications unit 16 which communicates with a communications unit 18 located at central processing unit/multiple sound controller (CPU/MSC) 20. In the preferred embodiment, the communications units are conventional wireless radio or infrared transceivers or the like. Alternatively, the reference sound pickups could be hardwired directly to CPU/MSC 20, in which case communications units 16, 18 would be replaced with cabling. One or more primary sound pickups 22 are also placed in the user's environment of interest to acquire sound from desired sound sources 12. As with reference sound pickups 14, primary sound pickups 22 include a communications unit 24 for communication with CPU/MSC 20 by wire, wireless radio, infrared or the like.

The apparatus also includes a user interface 26 for presenting processed sound to the user. Preferably, user interface 26 comprises a conventional headset having a set of ear covers or cups that acoustically isolate the user's ears from ambient sounds, modified to include a miniature speaker inside each cup. Alternatively, a bone vibration transducer placed on the mastoid process could be used to transmit vibrations to the user's inner ear, e.g., for listeners with hearing conduction loss. The speakers or bone vibrators are then connected with a communications unit 28 that communicates with CPU/MSC 20 via wireless radio, infrared or the like. Alternatively, where the CPU/MSC is carried by the user, a wire connection could be used.

The invention further includes a remote control unit 30 which employs conventional technology such as is used in connection with television, video cassette systems, stereo radio systems and the like. Remote control unit 30 can include an integral or separate communications unit 32 for communications with CPU/MSC 20 via wireless radio, infrared or the like, or for communications by a direct wire connection. Communications can be unidirectional for sending commands to CPU/MSC 20 or bidirectional for also receiving status information or the like from CPU/MSC 20.

Reference sound pickups 14 are preferably of a directional and/or shielded (D/S) type so that they ideally acquire sound only from the interfering sources to be controlled, and keep the acquired sound from all other sound sources to a minimum. These sound pickups can be fixed in position adjacent to the sound source to be controlled, or can be mounted on a moving sound source. On the other hand, primary sound pickups 22 are preferably stationary and omni-directional so as to acquire all sounds the listener would like to hear, except possibly remote sounds to be acquired by reference pickups and, to whatever extent is unavoidable, the interfering sound sources to be selectively suppressed. Alternatively, one or two D/S-type primary sound pickups 22 could be mounted on the user's headset, one for each side of the head or one at the top that is forward directional so that the user will obtain a sense of direction to the desired sound source, depending on head orientation or motion.

Each of the sound pickups can be battery powered or powered by a permanent power supply. Where battery power is used, in order to conserve power the user can be provided with the capability of powering down the sound pickup from remote control unit 30 and powering it on again at will. In that case, the communications units associated with the sound pickups would be transceivers; otherwise, only transmitters would be required. CPU/MSC 20 generally comprises a conventional central processing unit (CPU), such as a microprocessor or the like with conventional input/output and communications interfaces, and a multi-channel multiple-sound controller (MSC), including analog-to-digital and digital-to-analog converters when the MSC is implemented digitally. Communications unit 18 generally comprises a multi-channel communications unit which communicates via wireless radio, infrared or the like with all of the sound pickups, with the user's remote control unit 30, and with user interface 26, except to the extent that any of those components are hardwired to CPU/MSC 20. Accordingly, CPU/MSC 20 includes conventional software and logic encoders/decoders to translate control signals received from remote control unit 30 into instructions which include system on/off, channel select (e.g., sound pickup on/off and/or sound source on/off), volume control (e.g., each reference-sound source channel selected has its own volume control, and the primary channel also has its volume control which controls the gain on e(n)), and location selection (e.g., if the system is installed in a suite of rooms, each containing its own primary sound pickup or other extended space, or if the listener wants to switch between a primary sound pickup in a fixed location and a primary sound pickup on the headset).

Figure 2:
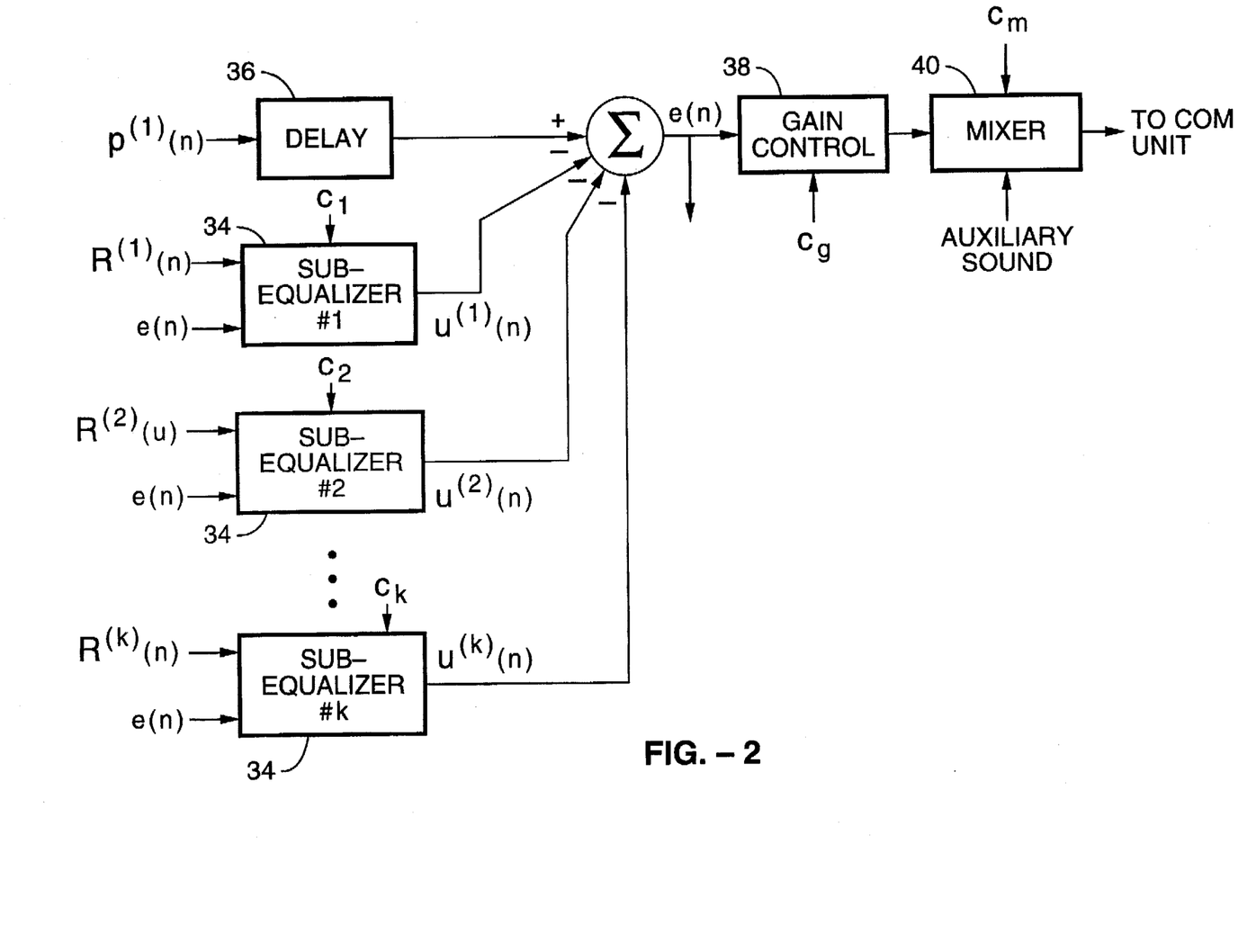
FIG. 2 is a functional block diagram of an embodiment of the multi-channel adaptive multiple-sound controller element shown in FIG. 1.
Figure 3:
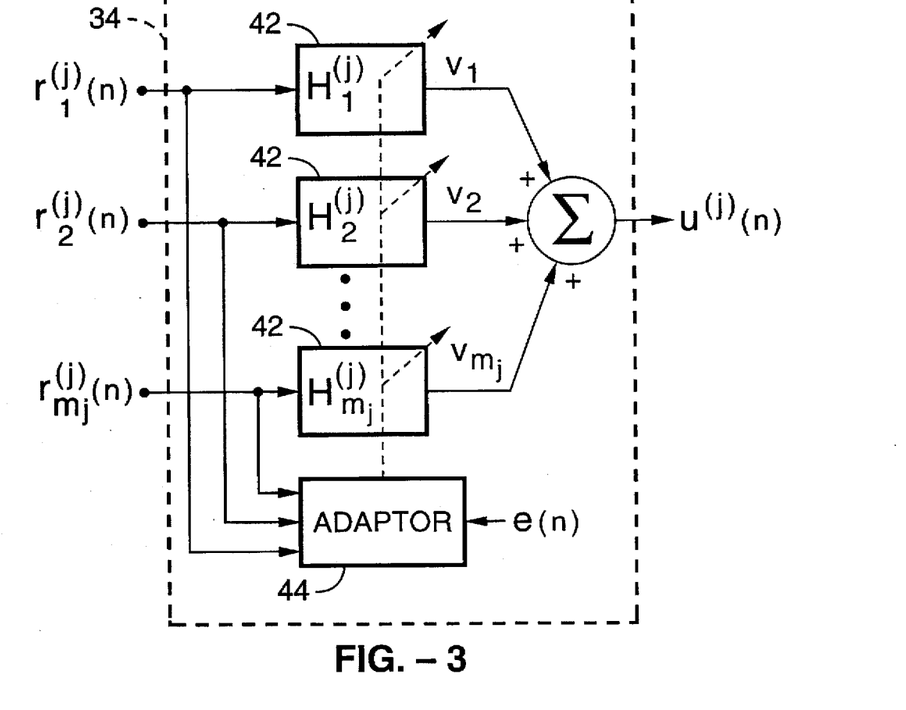
FIG. 3 is a functional block diagram of one of the subequalizer stages shown in FIG. 2.
Figure 5:
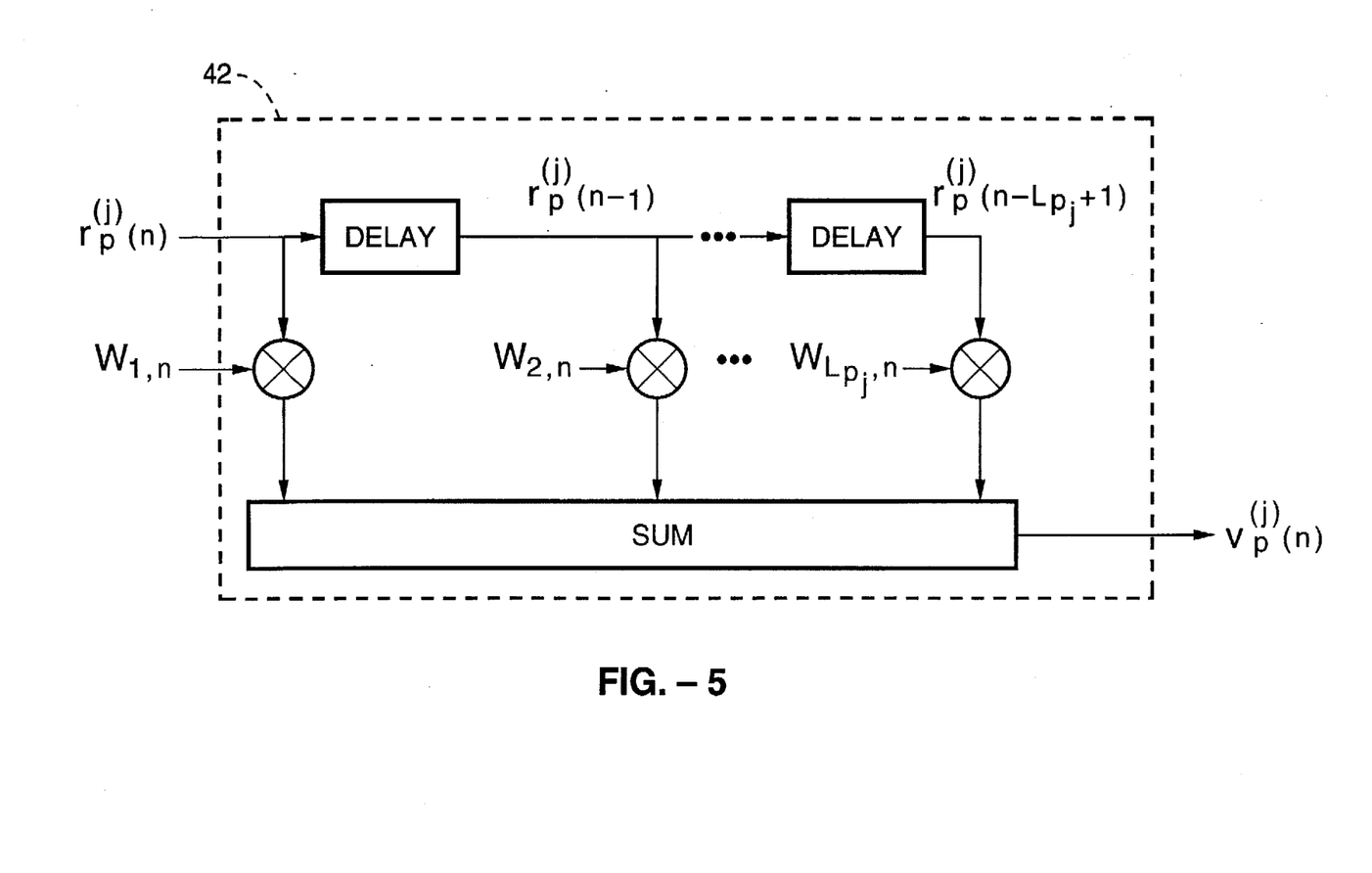
FIG. 5 is a functional block diagram of one of the $H_p^{(j)}$ equalizer components employed in the present invention.

Referring now to FIG. 2, the MSC portion of CPU/MSC 20 can be seen configured in a parallel form. The primary input $p^1(n)$ to delay 36 is the signal from the first primary sound pickup after passage through an analog-to-digital converter for a digitally implemented MSC. This digital signal is adjusted by delay 36 which is chosen for each particular application to ensure that causal subequalizers can perform as well as non-causal subequalizers, with the total number k of subequalizers 34 being equal to the number of reference sound sources to be controlled. While there may be multiple primary sound pickups employed in the apparatus, only one omnidirectional fixed location primary sound pickup would be selected at a time depending upon the room or other location in which the user is situated. It will be appreciated, however, that where two D/S sound pickups are positioned as primary sound pickups on the user's headset, both of those primary sound pickups would be active at the same time, and two copies of the MSC, or one time-shared copy, would be required. The reference signals $$R^{(1)}(n), \ldots, R^{(k)}(n)$$

are each vector-valued (multi-variate, m>1, or uni-variate, m=1) signals received from the reference sound pickups mounted on or near the various sound sources to be controlled and passed through analog-to-digital converters for a digitally implemented MSC; that is, $$R^{(j)}(n) = \{r_1^{(j)}(n), \ldots, r_{m_j}^{(j)}(n)\}$$

where $R^{(j)}(n)$ is the $j^{th}$ vector valued digital signal received from the reference sound pickups, $r_{m_j}^{(j)}(n)$ is the scaler-valued signal which is the $m_j^{th}$ element of $R^{(j)}(n)$ and $m_j$ is the number of reference sound pickups associated with the $j^{th}$ sound source. The total set of reference signals, M in number, is partitioned into k subsets, where k can be as small as 1 or as large as M, depending on the application. Typically, each subset of reference signals will be obtained from reference sound pickups associated with a single-sound source. The $c_1, \ldots, c_k$ represent source-selective volume control signals from the CPU that determine the degree of subequalizer attenuation or amplification of sounds from particular sound sources. Amplification (as opposed to attenuation) of the sound from a source is typically realized by switching off all but one component equalizer (finite impulse response—"FIR"—filter) $H_p$ in a subequalizer (see FIG. 3), switching off all weights but one $w_q$ in $H_p$ (see FIG. 5), and setting the value of $w_q$ to give the desired amplification. Thus with a single volume control on the remote control unit, for each sound source the user can turn up or turn down the volume. An overall gain control 38 is provided with $c_g$ representing a control signal from the CPU that determines the gain of the processed environmental sound e(n) Further, a mixer 40 is provided to mix auxiliary sound from sources such as telephones, intercoms, CD players, and the like, with $c_m$ representing a control signal from the CPU that determines operation of mixer 40. Mixer 40 either selects between the processed environmental sound e(n) and the auxiliary sound, or superimposes the auxiliary sound on top of the processed environmental sound as needed.

Figure 4:
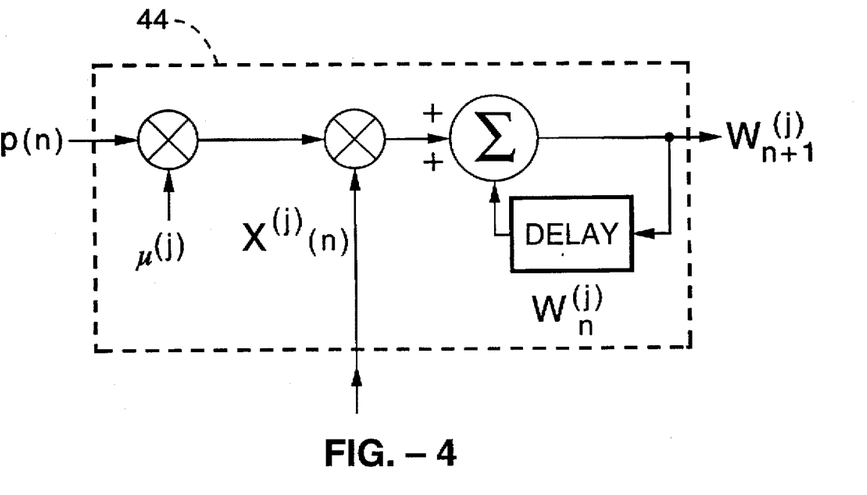
FIG. 4 is a functional block diagram of the adaptor stage shown in FIG. 3 showing an embodiment of a recursive update structure for the adaptive weights.

Referring also to FIG. 3, it will be appreciated that the component equalizer vectors r of time samples of reference signals stored in the FIR filters, as shown in FIG. 5, in a typical subset of size $m_j$ of component equalizers 42 are concatenated together to form one data vector $X^{(j)}(n)$ for the $j^{th}$ subequalizer at time n denoted by $$X^{(j)}(n) = [r_1^{(j)}(n) \ldots r_1^{(j)}(n-L_1) \ldots r_{m_j}^{(j)}(n) \ldots r_{m_j}^{(j)}(n-L_{m_j})]$$

which is one of the two inputs to the subequalizer adaptor 44 for updating weights $W_n^{(j)}$ as shown in FIG. 4 to be used in the subequalizer shown in FIG. 3. For $m_j$ subequalizers, $W_n^{(j)}$ is the concatenation of weights denoted by $$W_n^{(j)} = [w_{1,n}^{(1)} \ldots w_{L_1,n}^{(1)} \ldots w_{1,n}^{(2)} \ldots w_{L_2,n}^{(2)} \ldots w_{1,n}^{(m_j)} \ldots w_{L_{m_j},n}^{(m_j)}].$$

The vector of time samples for each reference signal in a subset are linearly combined by the action of the FIR filter shown in FIG. 5. At each time instant, the R time samples at the outputs of the k subequalizers are all subtracted from the primary-signal time sample, as shown in FIG. 2. The residual error signal e(n) provides one of the inputs to each subequalizer as shown in FIG. 2 and FIG. 3, the other input being the vector of reference signals, $R^j(n)$ for the $j^{th}$ subequalizer.

Referring also to FIG. 4 which shows an embodiment of subequalizer adapter 44 and FIG. 5 which shows an embodiment of a component equalizer 42, the $m_j$ component equalizers in each subequalizer are jointly adapted, but the k subequalizers are individually adapted using k copies of the adapter 44 or one time-shared copy of the adapter 44. Alternatively, the data can be partitioned into subbands by straightforward application of filter-bank technology, and then the embodiments shown in FIG. 4 and FIG. 5 can be applied separately to each subband. The results can then be frequency multiplexed back into one composite band (one signal). In still further alternative embodiments, the FIR filter shown in FIG. 5 can be partitioned into a cascade connection of shorter FIR filters whose lengths adds up to the length $L_p$, indicated in FIG. 5. This enables standard pipelining techniques to be used to speed up the processing. Yet other embodiments can modify the recursive update structure shown in FIG. 4, to accelerate convergence and/or reduce misadjustment after convergence. Such modifications include making the step-size parameters $\mu^{(j)}$ adaptive, performing singular value decomposition on the data vectors $X^{(j)}(n)$ to remove desired-signal leakage into the noise-reference data, possibly orthogonalizing the data correlation matrix or whitening the data, using adjustable band selective (but non-adaptive during normal operation) filtering or partial equalization of the data prior to passage through the adaptive component equalizers, and quantization of variables in the adapter to simplify multiplication operations. In yet further alternative embodiments, fast affine projection algorithms (which are approximate implementations of recursive least squares [RLS] algorithms) that can accelerate convergence of the adaptation can be used. In still yet further alternative embodiments, adaptive modular lattice structures for implementing the adaptive FIR filters, which provide for pipelining and other implementational advantages over the adaptive transversal structure shown in FIG. 4 and FIG. 5, can be used. Essentially all known alternatives to the LMS algorithm and transversal structure shown in FIG. 4 and FIG. 5, including those mentioned above as well as other variations on RLS and LMS algorithms are useful adaptive FIR equalizers, depending on the particular application and cost constraints.

Figure 6:
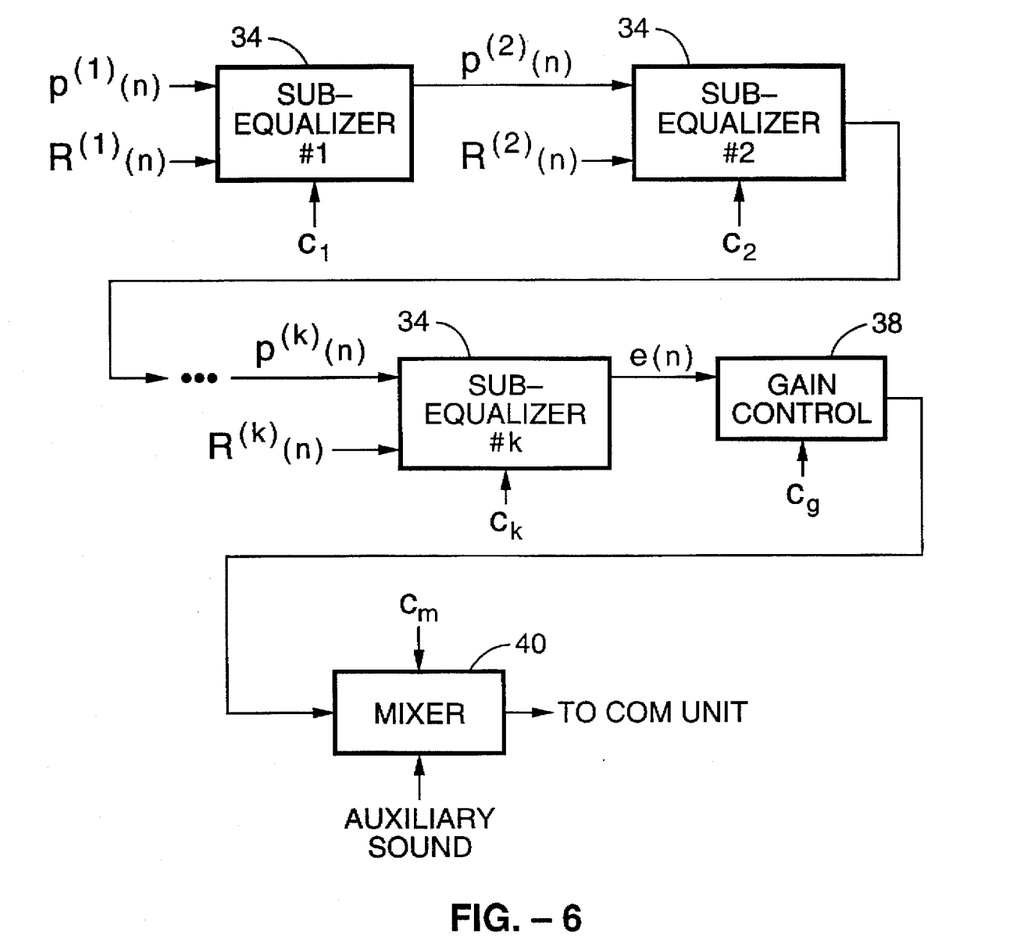
FIG. 6 is a functional block diagram of an alternative embodiment of the multi-channel adaptive multiple-sound controller element shown in FIG. 2.
Figure 7:
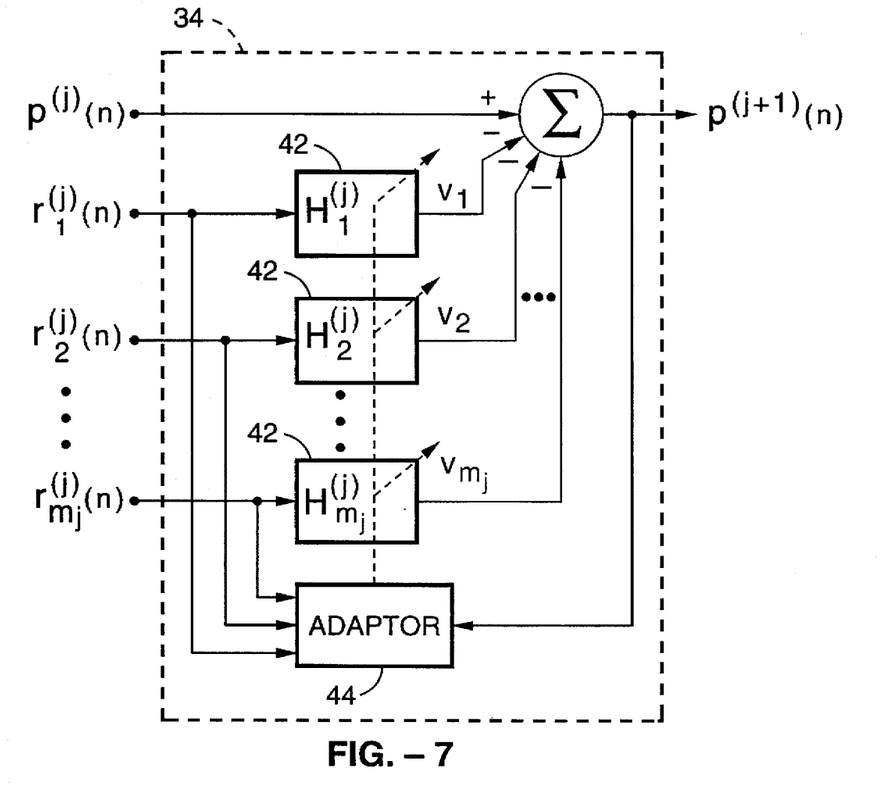
FIG. 7 is a functional block diagram of one of the subequalizer stages shown in FIG.
Figure 8:
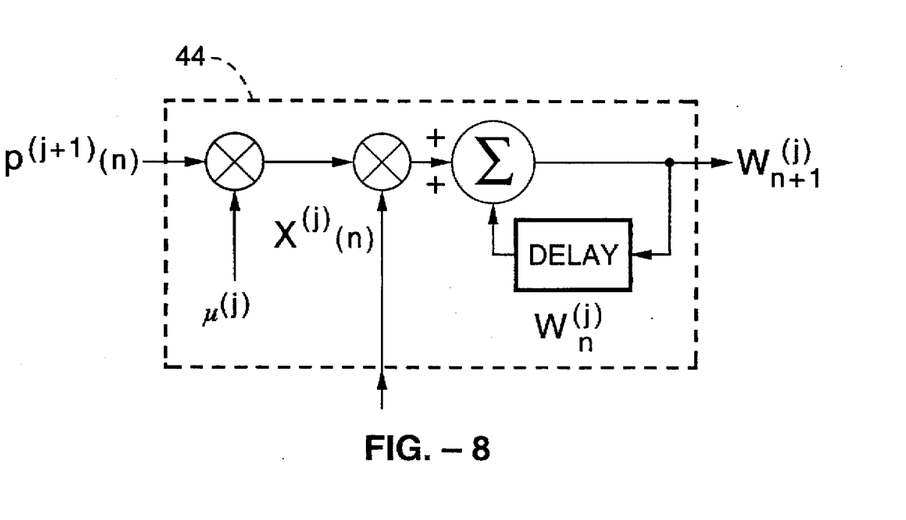
FIG. 8 is a functional block diagram of the adaptor stage shown in FIG. 7.

As indicated above, the MSC shown in FIG. 2 is configured in parallel form, and employs subequalizers as shown in FIG. 3, adaptors as shown in FIG. 4 and equalizer components as shown in FIG. 5. Each of the individual subequalizers is adapted independently of each other, but all use the same error signal e(n) This configuration has the advantage that, as the subequalizers proceed toward convergence of adaptation, the error signal for all of these subequalizers becomes decreasingly contaminated by the various sound sources. Alternatively, however, the MSC could be configured in a serial form as shown in FIG. 6. In this embodiment, the error signal is least contaminated by various sound sources in the last stage. However, more contamination exists in the next to the last stage and so on to the first stage in which no contamination from the other k−1 sound sources is removed. At each time instant, the time samples at the outputs of, say, the $j^{th}$ set of component equalizers 42 are summed and subtracted from the $j^{th}$ primary signal by the $j^{th}$ subequalizer, as shown in FIG. 7. The residual thus forms the primary signal for the $(j+1)^{th}$ subequalizer, as shown in FIG. 6. Each subequalizer is made up of one or more component equalizers, the $p^{th}$ of which is shown in FIG. 5. The adaptor 44 used with this embodiment can be seen in FIG. 8.

It will be appreciated that there may be situations where reference microphones cannot be used with at least some of the noise sources. It will further be appreciated that, when some sources of undesired noise emit their acoustic energy primarily in subbands of the overall audio band that can be eliminated from the desired sound without an unacceptable degree of degradation to the desired sound, then the undesired sound can be substantially suppressed simply by using band stop filtering directly in the primary signal path just prior to the summing device in FIG. 2. For example, 1. For a listener sitting on a veranda listening to the ocean surf and being irritated by screaming kids on the beach or near the veranda, since the screams are mostly at frequencies higher than those of the crashing surf they can be filtered away.
2. The most annoying part of some rotating machinery noise resides in 2 to 3 harmonically related narrow bands, which can be filtered away.
3. The most annoying part of kids screams of excitement (or terror) are those at relatively high frequencies, compared with the overall voice band, which can be filtered away.
4. For a listener in the garden listening to bird songs, and being disturbed by noisy trucks and buses, since the disturbing noise is mostly at low frequencies and the bird songs are mostly at high frequencies, the noise can be filtered away.

Figure 9:
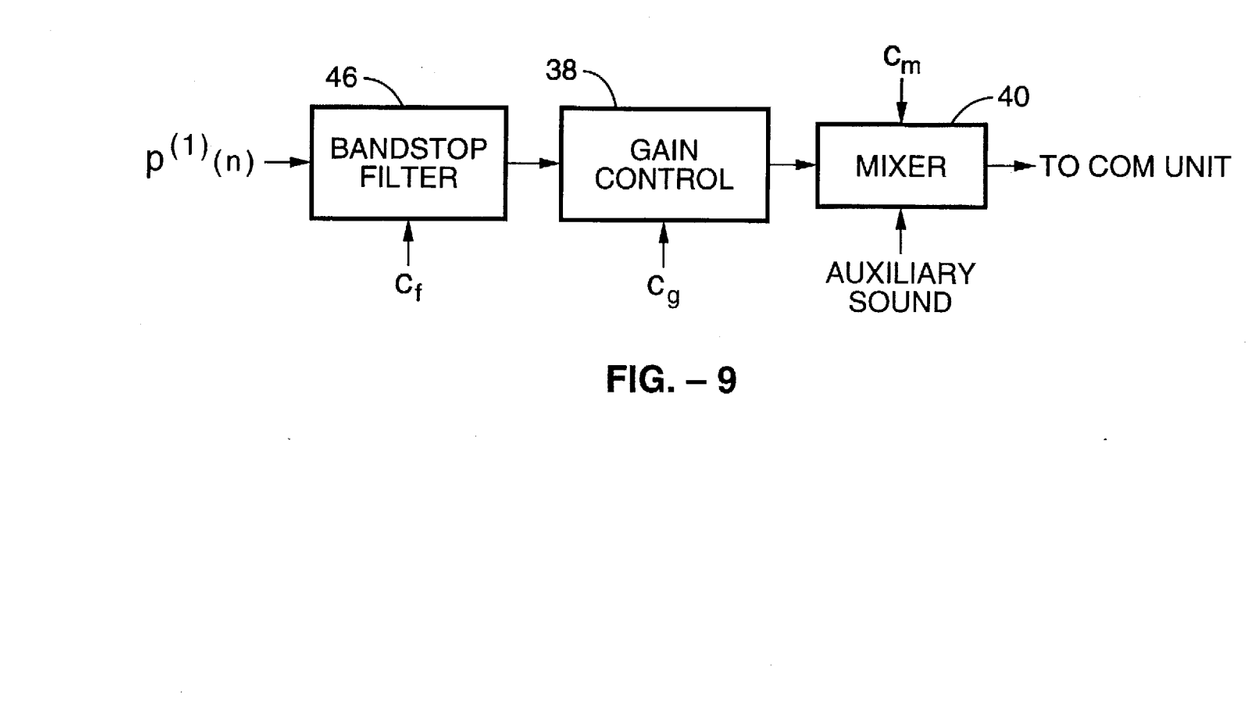
FIG. 9 is a functional block diagram of an alternative embodiment of the multiple-sound controller element shown in FIG. 2 configured for filtering sounds as opposed to sound cancellation.

In order to render this noise suppression technique adaptive, both the center frequency and bandwidth of the band stop filter would be made tunable. For example, for each center frequency, there should be options for bandwidth, expressed in percent of the center frequency, of, say, 10, 20, 30, 40, 50 percent. Further, lowstop and highstop filters could be provided. The most economical implementation of this option would be to use the FIR in one of the subequalizers and switch the FIR from a reference path to the primary path. An alternative that simplifies the algorithm for setting center frequency and bandwidth is a frequency-domain filter preceded and followed by FFT algorithms. However, superior performance could be obtained in some applications by using more highly selective filter structures, such as IIR filters. For the purpose of illustration, an MSC that uses only bandstop filtering to control noise is shown in FIG. 9. The bandstop filter 46 can be controlled by control input $C_f$ from the CPU to reject sounds from one or more sources residing in one or more subbands of the overall audio band. This simplified MSC can be implemented in analog rather than digital form as a cost saving measure.

Accordingly, it will be seen that this invention permits a user to selectively control the loudness of desired and undesired sounds in his or her sound environment by employing one or more primary sound pickups, one or more reference sound pickups, a CPU/MSC, a remote control unit, and a user interface such as an acoustically isolating speaker headset. The CPU/MSC receives from the primary sound pickups desired and undesired sounds including sounds to be controlled, receives the sounds to be controlled from the reference sound pickups, and receives control signals from the remote control unit. The sound signals are processed by the CPU/MSC using selective filtering, selective adaptive cancellation and selective amplification so as to allow the user to have the flexibility of adjusting the relative volumes of the individual controlled sounds and the composite processed sounds using the remote control unit. The resulting composite processed sound signal(s) is then fed to the acoustically isolating speaker headset. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A sound environment control apparatus, comprising:
    (a) a primary sound pickup;
    (b) a reference sound pickup;
    (c) signal processing means for processing a composite signal having a signal of interest and an interfering signal acquired by said primary sound pickup, for processing said interfering signal acquired by said reference sound pickup, and for producing an output signal wherein the amplitude of said interfering signal in said output signal can be controlled in relation to the amplitude of said signal of interest;
    (d) user interface means, communicating with said signal processing means, for presenting said output signal to a user; and
    (e) remote control means, communicating with said signal processing means, for controlling the amplitude of said interfering signal in said output signal;
    (f) wherein said reference sound pickup is stationary, wherein said reference sound pickup is located remote from said user, and wherein said user may freely move within a sound domain without moving said reference sound pickup.

2. An apparatus as recited in claim 1, further comprising means for controlling the amplitude of said signal of interest in said output signal.

3. An apparatus as recited in claim 1, wherein said primary sound pickup is stationary and omnidirectional.

4. An apparatus as recited in claim 1, wherein said primary sound pickup is coupled to said user interface means.

5. An apparatus as recited in claim 1, wherein said primary sound pickup is directional.

6. An apparatus as recited in claim 1, wherein said reference sound pickup is shielded from said signal of interest.

7. An apparatus as recited in claim 1, wherein said reference sound pickup is directional.

8. An apparatus as recited in claim 1, further comprising:
    (a) means for transmitting said composite signal acquired by said primary sound pickup to said signal processing means; and
    (b) means for transmitting said interfering signal acquired by said reference sound pickup to said signal processing means.

9. An apparatus for controlling a sound environment, comprising:
    (a) primary sound pickup means for acquiring a composite acoustic signal, said composite signal comprising a signal of interest and a plurality of different interfering signals;
    (b) a plurality of stationary reference sound pickup means for acquiring said interfering signals, wherein each said reference sound pickup means acquires a different interfering signal;
    (c) signal processing means for processing said composite signal, for processing said interfering signals, and for producing an output signal wherein each said interfering signal can be independently selected and the amplitude of said selected interfering signal in said output signal can be controlled in relation to the amplitude of said signal of interest;
    (d) user interface means, communicating with said signal processing means, for presenting said output signal to a user; and
    (e) remote control means, communicating with said signal processing means, for independently selecting each said interfering signals and controlling the amplitude of said selected interfering signal in said output signal.

10. An apparatus as recited in claim 9, wherein said remote control means includes means for controlling the amplitude of said signal of interest in said output signal.

11. An apparatus as recited in claim 9, wherein said primary sound pickup means is stationary and omnidirectional.

12. An apparatus as recited in claim 9, wherein said primary sound pickup means is coupled to said user interface means.

13. An apparatus as recited in claim 9, wherein said primary sound pickup means is directional.

14. An apparatus as recited in claim 9, wherein said plurality of reference sound pickup means are shielded from said signal of interest.

15. An apparatus as recited in claim 9, further comprising:
 (a) means for transmitting said composite signal from said primary sound pickup means to said signal processing means; and
 (b) means for transmitting said interfering signals from said plurality of reference sound pickup means to said signal processing means.

16. A sound control apparatus, comprising:
 (a) primary sound pickup means for acquiring a composite acoustic signal, said composite signal comprising a signal of interest and a plurality of interfering signals;
 (b) a plurality of reference sound pickup means for acquiring said interfering signals, wherein each said reference sound pickup means acquires a different interfering signal;
 (c) signal processing means for processing said composite signal, for processing said interfering signals, and for producing an output signal wherein each said interfering signal can be independently selected and the amplitude of said selected interfering signal in said output signal can be controlled in relation to the amplitude of said signal of interest;
 (d) said primary sound pickup means and said plurality of reference sound pickup means communicating with said signal processing means;
 (e) user interface means, communicating with said signal processing means, for presenting said output signal to a user; and
 (f) remote control means, communicating with said signal processing means, for independently selecting each said interfering signal and controlling the amplitude of said selected interfering signal in said output signal;
 (g) wherein said primary sound reference means and said plurality of reference sound pickup means are stationary, wherein said primary sound reference means and said plurality of reference sound pickup means are located remote from said user, and wherein said user may freely move within a sound domain without moving said primary sound pickup means or said plurality of reference sound pickup means.

17. An apparatus as recited in claim 16, wherein said remote control means includes means for controlling the amplitude of said signal of interest in said output signal.

18. An apparatus as recited in claim 16, wherein said primary sound pickup means is omnidirectional.

19. An apparatus as recited in claim 16, wherein said primary sound pickup means is coupled to said user interface means.

20. An apparatus as recited in claim 16, wherein said primary sound pickup means are directional.

21. An apparatus as recited in claim 16, wherein said plurality of reference sound pickup means are shielded from said signal of interest.

22. An apparatus as recited in claim 16, wherein said plurality of reference sound pickup means are directional.

23. An apparatus as recited in claim 16, further comprising:
 (a) means for transmitting said composite signal from said primary sound pickup means to said signal processing means; and
 (b) means for transmitting said interfering signals from said plurality of reference sound pickup means to said signal processing means.

\* \* \* \* \*